(12) United States Patent
Götz et al.

(10) Patent No.: US 8,332,867 B2
(45) Date of Patent: Dec. 11, 2012

(54) METHODS AND DEVICES FOR SENDING TRANSMISSION-TIME OR RECEPTION-TIME INFORMATION FOR A TRANSMITTED OR RECEIVED MESSAGE

(75) Inventors: Franz-Josef Götz, Heideck (DE); Rolf Knoerzer, Berg-Kempfenhausen (DE); Stephan Schüler, Witten (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1146 days.

(21) Appl. No.: 12/224,240

(22) PCT Filed: Feb. 22, 2006

(86) PCT No.: PCT/EP2006/001629
§ 371 (c)(1),
(2), (4) Date: Aug. 21, 2008

(87) PCT Pub. No.: WO2007/098775
PCT Pub. Date: Sep. 7, 2007

(65) Prior Publication Data
US 2009/0013330 A1 Jan. 8, 2009

(51) Int. Cl.
G06F 3/00 (2006.01)
G06F 9/44 (2006.01)
G06F 9/46 (2006.01)
G06F 13/00 (2006.01)

(52) U.S. Cl. .................. 719/313; 709/207; 709/230

(58) Field of Classification Search ............... None
See application file for complete search history.

(56) References Cited

U.S. PATENT DOCUMENTS

| 5,884,171 | A  | * | 3/1999  | Tanabe et al. ............... 455/434 |
| 6,208,665 | B1 | * | 3/2001  | Loukianov et al. ........... 370/486 |
| 6,725,240 | B1 | * | 4/2004  | Asad et al. ...................... 1/1 |
| 7,558,270 | B1 | * | 7/2009  | Wilford et al. ............ 370/395.42 |
| 2003/0021274 | A1 | * | 1/2003 | Siikaniemi et al. ........... 370/392 |
| 2003/0235216 | A1 |   | 12/2003 | Gustin |
| 2004/0243686 | A1 | * | 12/2004 | Schilders ..................... 709/213 |

(Continued)

FOREIGN PATENT DOCUMENTS
WO  WO 01/88746 A1  11/2001

OTHER PUBLICATIONS
The TCP/IP Guide—OSI Reference Model Layers, Aug. 12, 2004, pp. 1-3.*

(Continued)

*Primary Examiner* — S. Sough
*Assistant Examiner* — Craig Dorais

(57) ABSTRACT

Upon reception of a message which is relevant to synchronization, the circuitry in a device forms a piece of reception-time information and this information is inserted into or appended to the received message and forwarded such that the reception-time information can be received by at least one synchronization application in the device. When a message is transmitted, the circuitry in the device forms a piece of transmission-time information, and this information is sent to at least one synchronization application initializing the message in the device. A fundamental advantage can be seen in that the economic outlay, particularly the outlay in terms of circuitry, for implementing the synchronization of the clocks and the determination of the communication-network or transmission-medium delay times, particularly on the basis of the IEEE standard 1588, m is substantially reduced.

4 Claims, 2 Drawing Sheets

U.S. PATENT DOCUMENTS

2005/0117596 A1* 6/2005 Kopetz .................. 370/401
2005/0213524 A1* 9/2005 Doragh et al. ............ 370/311
2006/0239300 A1* 10/2006 Hannel et al. ............ 370/503

OTHER PUBLICATIONS

The TCP/IP Guide—Network Layer (Layer 3), Aug. 12, 2004, pp. 1-3.*

Weibel et al., 2004 Conference on IEEE 1588 (online), Implementation and Performance of Time Stamping Techniques, Sep. 28, 2004, pp. 1-15, XP002400351; Zürich University.

Holler et al., "Embedded SynUTC and IEEE 1588 Clock Synchronizatin for Industrial Iternet", 2003, pp. 422-426, XP 10670459.

Stephan Schüler, IEEE 1588 Security Extensions Requirements and proposed solutions; 2005 Conference IEEE 1588 (online); Sep. 29, 2005, pp. 1-3, 10-18; XP002400352.

John Edision; "IEEE-1588 Standard for a Precision Clock Synchronization Protocol for Networked Measurement and Control Systems", Tutorial on IEEE 1588 From Agilent Technologies Oct. 10, 2005, pp. 1-2, 61-88; XP002400353.

* cited by examiner

METHODS AND DEVICES FOR SENDING TRANSMISSION-TIME OR RECEPTION-TIME INFORMATION FOR A TRANSMITTED OR RECEIVED MESSAGE

CROSS REFERENCE TO RELATED APPLICATIONS

This application is the US National Stage of International Application No. PCT/EP2006/001629, filed Feb. 22, 2006 and claims the benefit thereof and is incorporated by reference herein in its entirety.

FIELD OF INVENTION

The invention relates to a communication network in accordance with the claims.

BACKGROUND OF THE INVENTION

In distributed communication networks, especially packet-oriented communication networks, a precise time synchronization of the components of the communication network is increasingly required. For this purpose, a "Precision Time Protocol", known in the technical world as PTP, is used for packet-oriented communication networks, with which real time clocks of spatially-distributed components of the communication network, especially of an ethernet, can be synchronized. The known PTP is standardized in IEEE Standard 1588, which for example is described in the Publication 2004 Conference on IEEE 1588, Sep. 28, 2004, "Implementation and Performance of Time Stamping Techniques, Hans Weibel, Dominic Béchaz According to this standard, a master, shown in FIG. 3 by a vertical line marked M, is defined in one of the components of the communication network, with a synchronization message SYN-N being transmitted at regular time intervals via a communication network KN to its slaves and/or components and/or devices and/or terminals, shown in FIG. 3. by a vertical line marked S. This synchronization message SYN-N contains the current time $t_M$ of the clock arranged in the master M. Because reading the clock, processing the protocol, running through the protocol stacks and transmitting the data through an ethernet controller takes an undefined time, the time information in the synchronization message SYN-N is already out of date when leaving the master M. Therefore, the actual transmission time point of the synchronization message is measured as close as possible to the physical interface, ideally directly at the communication network terminal of the hardware, and this is sent as transmission-time information $t_{MT}$ by means of a follow-up message FUP-N to the slave S. In the standard and in the technical world, this transmission-time information $t_{MT}$ is known as the time stamp. The receiving devices or terminals, i.e. the slaves S, represent the reception-time point and form reception-time information $t_{SE}$. The reception-time information $t_{SE}$ gives the time point at which the synchronization message SYN N SYNC N was accepted or received from the transmission medium, with the reception time point being determined in the physical layer or in the circuitry. From the sent transmission-time information $t_{MT}$ and the determined reception-time information $t_{SE}$ in the slave S, the deviation $t_A$ or the offset of its real time clocks is then determined. The clock of the slaves S is corrected according to the determined deviation $t_A$, i.e. synchronized with the clock of the master M.

If there has been no delay in the transmission path, then both clocks will already be synchronized. A second phase of the synchronization process determines the delay time between the slaves S and the master M, i.e. the measurement of the transit time. For this purpose, the slave S sends a "delay request" or request message DREQ-N to the master M in accordance with IEEE Standard 1588 and for this again determines the exact transmission time point $t_{ST}$. The master M generates a piece of reception-time information $t_{ME}$ on receipt of the request message DREQ-N and sends the reception-time information $t_{ME}$ back to the slave S in a "delay response" or response message DRES-N. From the local transmitted and received pieces of reception-time information $t_{ST}$, $t_{ME}$ or from both time stamps, the slave S determines the delay time or transit time $t_L$ in the communication network KN between the slave S and master M. The transit time measurement takes place irregularly and at longer time intervals as a measurement for synchronization of the two clocks.

For determining the reception time points of received synchronization-relevant messages or the transmission time points of the synchronization-relevant messages to be sent, a time stamp unit, which determines the time points or time stamps, is provided in the devices. The determination of the deviations $t_A$ of the real time clocks and the transit times $t_L$ is performed with the aid of the PTP (Precision Time Protocol), with the PTP being realized in the application layers of the devices or terminals. Because the time points or the time stamps are formed in the physically close layer, in order to be able to determine the deviations $t_A$ of the clocks and of the transit time $t_L$ in the communication network as accurately as possible the time points or time information is buffer stored in memories of the physical layer until they are called up by the PTP in the application layer. This means that in practice several pieces of time information for several messages and several PTP have to be stored in the memories for several applications in the physical layer. Furthermore, not only is it necessary to store the time information in the memories but a piece of information which enables the assignment of the time information to the respective message also has to be stored, so that the respective PTP in the application layer can appropriately call up the time information from the memories.

For the realization of the PTP according to the IEEE 1588 Standard therefore extensive memories and protocols, to be realized in extensive circuits and programs, are necessary to call up the time information from the memories in the circuit layers or in the hardware layer of the device or terminals of a communication network, such as in an intranet or in the Internet.

SUMMARY OF INVENTION

The object of the invention is to improve the realization of PTP according to the IEEE Standard 1588 or other protocols by means of time stamps. The object is achieved by the features of the Claims.

A fundamental aspect of the invention can be seen in that on reception of a synchronization-relevant message, which is formed in or at a physical layer (PH) of a device, the formed reception-time information is inserted into the received message and forwarded in such a way that the reception-time information can be received by at least one program of the device. A further fundamental aspect is that when sending a synchronization-relevant message which is formed in the circuit in a device, the formed transmission-time information is provided to at least one program of the device initializing the message.

A fundamental advantage of the invention can be seen in that, in the physical layer formed in the circuit the memories for storing the reception-time or transmission-time information, the application-specific information and the protocols for calling up the stored synchronization-relevant information are no longer required and the cost of circuitry or the economic outlay for the realization of the synchronization of the clocks and for determining the transmission times of the communication network or transmission medium is substantially reduced.

Advantageous developments of the inventive methods and inventive embodiments of a device and a time stamp unit are given in the further patent claims.

BRIEF DESCRIPTION OF THE DRAWINGS

In the following, the invention is described in more detail by means of the three drawings based on the method described in FIG. 3. The drawings are as follows.

DETAILED DESCRIPTION OF INVENTION

Figure 1A:
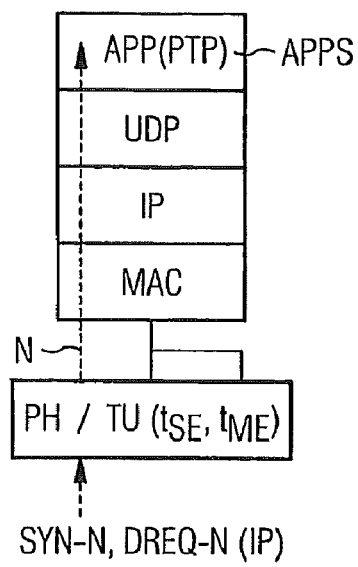
FIG. 1A is a diagram illustrating an embodiment of the forwarding of a piece of reception-time information from a physical layer to an application layer.
Figure 1B:
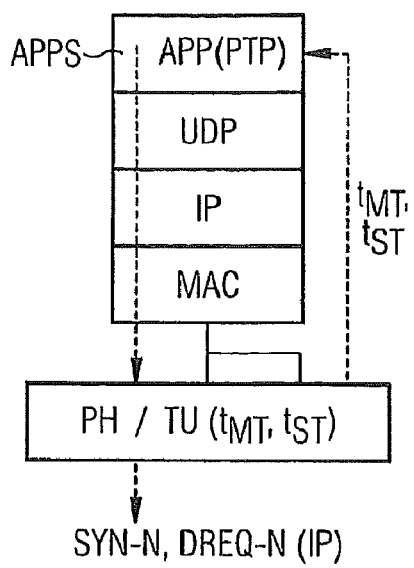
FIG. 1B is a diagram illustrating an embodiment of the forwarding of a piece of transmission-time information from a physical layer to an application layer.

For the exemplary embodiment, it is assumed that in the structure shown in FIG. 1A and FIG. 1B, the layers are for a device or terminal or master M or slave S, which are connected to the communication network KN, realized as the Internet IN or an ethernet. The physical connection to the layer realizing the Internet IN is a physical layer PH. This is followed by a medium access control MAC, an Internet protocol IP, a transport layer UDP (User Datagram Protocol) and an application layer APPS, in which a synchronization application PTP for an application APP is realized according to the IEEE Standard 1588, referred to in the following as the precision time protocol (PTP). To explain the invention, the physical layer PH and the application layer APPS with the precision time protocol PTP are mainly considered.

In the physical layer PH, a time stamp unit TU is provided for determining the transmission time points and reception time points of synchronization-relevant messages N, with a piece of reception time and transmission-time information $t_E$, $t_S$ being formed from the determined transmission and reception time points. For the exemplary embodiment, it is further assumed that the synchronization-relevant messages N are represented by a synchronization message SYNC-N given in the IEEE Standard 1588, a follow-up message FUP-N, a request message DREQ-N and a response message DRES-N.

Figure 3:
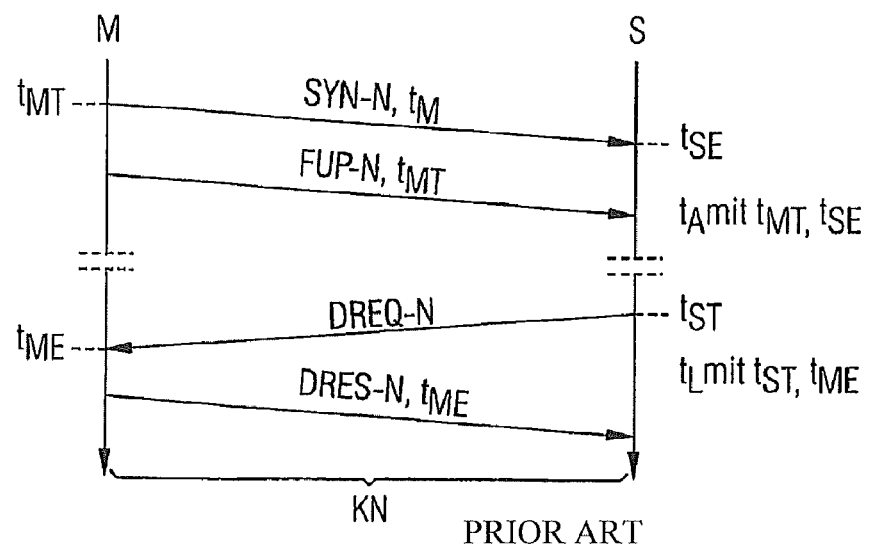
FIG. 3 is a flow chart illustrating an embodiment of a communication of messages between a master and a slave that may be used for time synchronization.

For the exemplary embodiment in FIG. 1A, it is further assumed that according to IEEE Standard 1588 a synchronization message SYNC-N is sent from the master M to the slave S or a request message DREQ-N is sent from the slave S to the master M, see FIG. 3, with the reception time point being determined in each case in the physical layer PH with the aid of the time stamp unit TU and a piece of reception-time information $t_{SE}$, $t_{ME}$ being formed. The determination of the reception time point is carried out as close as possible to the transmission medium of the Internet IN, in order to be able to determine deviations $t_A$ of the clocks of the master M and slave S, and also the transit times $t_L$ of synchronization-relevant messages N in the Internet as accurately as possible.

Figure 2:
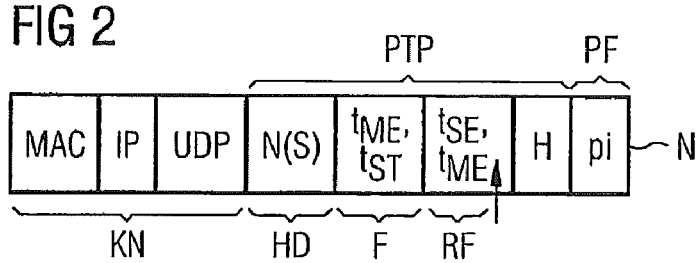
FIG. 2 is an embodiment of a construction of a synchronization-relevant message.
Figure 4:
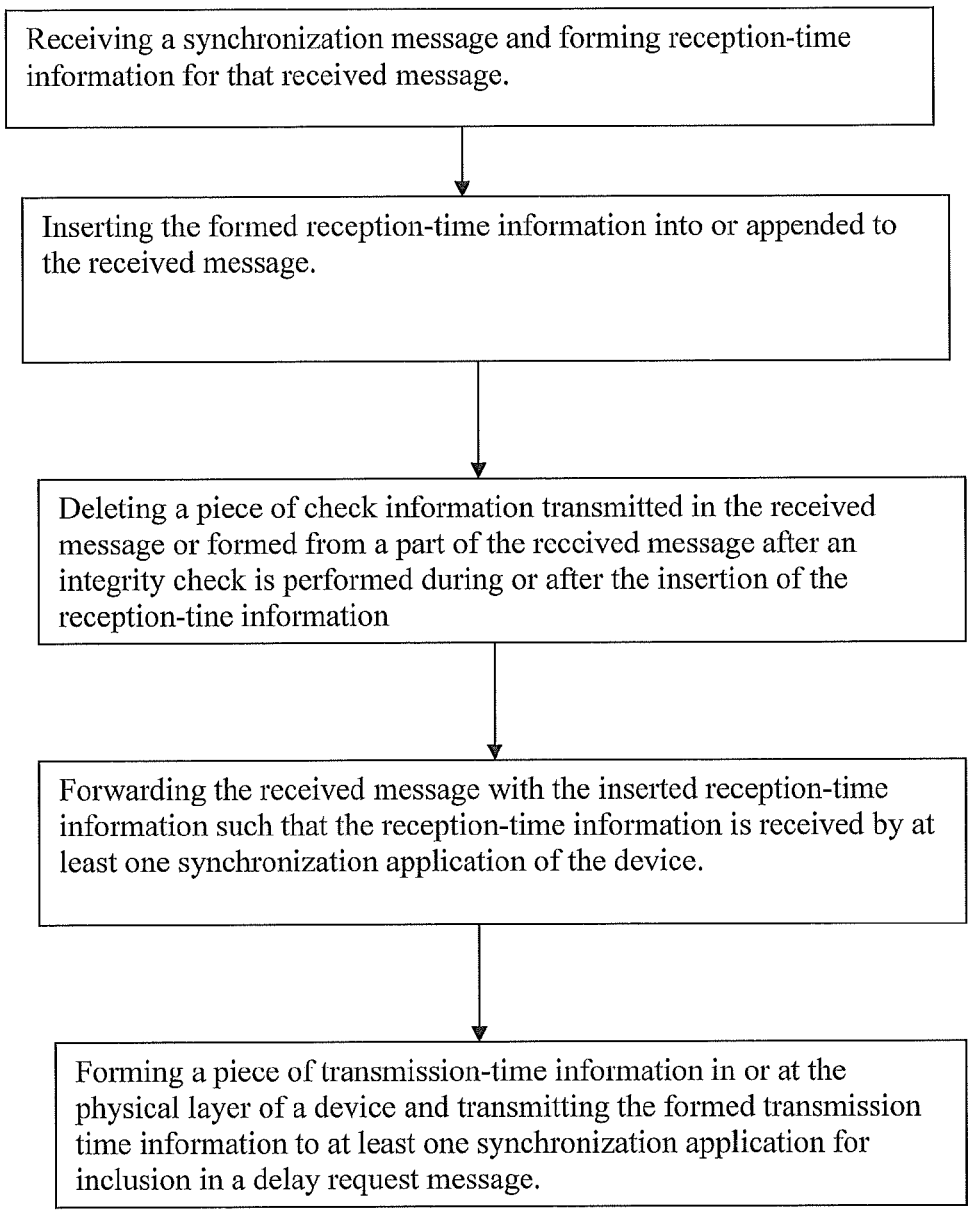
FIG. 4 is a flow chart illustrating an embodiment of a method of transmitting reception-time information on reception of a synchronization message.

FIG. 4 illustrates one embodiment of a method of transmitting reception-time information formed in or at the physical layer of a device for synchronization purposes. FIG. 2 shows the basic configuration of a synchronization-relevant message N using an example in accordance with IEEE Standard 1588. A header, shown in FIG. 2 by the designations MAC, IP and UDP, is provided in each case for sending the message N via the medium access control, the Internet protocol layer (IP) and the transport layer UDP. Information is inserted into the particular header which indicates the header of the following layer IP, UDP. For this purpose, bytes 0 to 41 are provided, according to the example in IEEE Standard 1588. The information for the precision time protocol PTP is contained in the part of the synchronization-relevant message N designated by PTP, with the precision time protocol PTP for example being realized in an application APP of the application layer APPS. The header HD of the precision time protocol PTP, bytes 42 to 78 in the standard according to the example, indicates which of the synchronization-relevant messages N is involved, shown by the designation SN in FIG. 2. These are, for example, the standard synchronization message SYN-N, the follow-up message FUP-N, the request message DREQ-N or the response message DRES-N, with the messages having a different number of bytes, 90, 98 or 154 bytes in the standard according to the example.

The reception-time information $t_{SE}$, $t_{ME}$ formed in the physical layer PH is now not stored in a memory of the physical layer PH for a call-up by the application APP but instead according to the invention is inserted into the received synchronization message SYN-N or request message DREQ-N, shown in FIG. 2 by the designation $t_{SE}$, $t_{ME}$. For this purpose, as shown in FIG. 2, a field RF, reserved for further information, of a synchronization-relevant message N is used, with this field RF FR being kept free in the example of the standard. As an alternative, the reception-time information $t_{SE}$, $t_{ME}$, can be inserted at the end of the precision time protocol PTP, as shown in FIG. 2 by an arrow. With a synchronization-relevant message N formed according to the example in IEEE Standard 1588, the reception-time information $t_{SE}$, $t_{ME}$ can, for example, be inserted into the four bytes 78 to 81, reserved for further information, of a PTP message.

Furthermore, in the precision time protocol PTP in field F according to the example in the standard, bytes 86 and 90 are provided for sending the reception time and transmission-time information $t_{ME}$, $t_{ST}$. Check information pi is entered in a further standard check field PF at the end of the synchronization-relevant message N, with whose help a check of the complete message N can be carried out in the master M and slave S. This is a piece of standard CRC check information (cyclic redundancy check). To ensure integrity, a hash value H is formed, usually by means of a hash process (e.g. HMAC-SHA1 according to the RFC Standard 2104), by using a secret key, for the precision time control PTP of the message N, which is then inserted at the end of the precision time protocol PTP of the message N.

Further information in the headers for the other protocol layers MAC, IP, IDP is not given.

In the exemplary embodiment it is assumed that the reception-time information $t_{SE}$, $t_{ME}$ covers only up to two seconds because the synchronization operation is regularly performed in corresponding time intervals. If the extent of the reception-time information $t_{SE}$, $t_{ME}$ exceeds one second, only the time information which follows the seconds information, for example given in nanoseconds, is inserted as reception-time information $t_{SE}$, $t_{ME}$ into the synchronization-relevant message N and forwarded to the relevant application APP. In the synchronization application PTP assigned to the application APP it is determined by the evaluation of two pieces of successive reception-time information $t_{SE}$, $t_{ME}$, whether the seconds were overshot between both and, depending on the result of the evaluation, either the current transmitted reception-time information $t_{SE}$, $t_{ME}$ is not changed or is incremented by one second, i.e. the original reception-time information $t_{SE}$, $t_{ME}$ is restored.

Before forwarding the synchronization-relevant message N to the relevant application APP in the application layer APPS or to the assigned precision timed protocol PTP, the check information pi or the hash value H is to be deleted according to a first variant, or according to a second variant a piece of check information pi or a hash value H is to be determined for the synchronization-relevant information including the additional reception-time information $t_{SE}$, $t_{ME}$ and is to be inserted into the check field PF or appended to the message N instead of the transmitted check information pi or hash value H. The first variant is advantageously in the physical layer PH during a check of the transmitted synchronization-relevant information and the second variant is provided during a check of the synchronization-relevant information in one of the following layers MAC, IP, UDP, APPS, with further check information in the headers for the other layers MAC, IP, UDP to be deleted or updated, provided the information also includes the precision time protocol PTP in the check information.

The synchronization-relevant message N is then forwarded with a piece of reception-time information $t_{SE}$, $t_{ME}$ through the succeeding layers MAC, IP, UDP to the precision time protocol PTP in the application layer APPS. There, depending on the reception-time information $t_{SE}$, $t_{ME}$ in each case, either the time deviation $t_A$ for the clock of the master or the transit time $t_L$ in the Internet IN is determined, see also FIG. 3. So that the application layer APPS can calculate and compare the hash value with the integrity check, it first resets the reserved fields modified by the reception unit to the original values.

For the exemplary embodiment in FIG. 1B, it is assumed, as with FIG. 1A, that in accordance with the IEEE Standard 1588 a synchronization message SYNC-N is sent from the master M to the slave S or a request message DREQ-N is sent from the slave S to the master M, see FIG. 3, with the transmission time point being formed in both cases in the physical layer PH in the master M or slave S with the aid of the time stamp unit TU and a piece of transmission-time information $t_{ST}$, $t_{MT}$ being formed. The transmission time point is measured as close as possible to the transmission medium of the Internet IN or of the ethernet representing the Internet IN in order to be able to determine the deviations $t_A$ of the clocks of the master M and of the slave S and the transit times $t_L$ of the synchronization-relevant messages N in the Internet IN as accurately as possible.

According to the invention, the transmission-time information $t_{ST}$, $t_{MT}$ is not stored in the physical layer PH but is instead forwarded directly, or after a short buffer storage, to the precision time protocol PTP in the relevant application APP and there it is buffer stored in the application APP or the application program until determination of the deviations $t_A$ of the clocks of the master M and of the transit times $t_L$ of synchronization-relevant messages N in the Internet IN or ethernet, as shown by an arrow represented by a broken line in FIG. 1B and marked $t_{ST}$, $t_{MT}$.

The invention is not limited to the exemplary embodiment but can also be used in communication networks where a boundary clock concept is provided in accordance with the IEEE Standard 1588, especially with the inclusion of routers in the communication network, and can also be used in communication networks where the synchronization-relevant messages are transmitted at least for comparing the clocks in the components of a communication network. In this case, parts of the message not used in the synchronization-relevant messages or for further applications are used for insertion of the reception-time information.

The invention claimed is:

1. A method for transmitting a piece of reception-time information formed in or at a physical layer of a device on reception of a synchronization-relevant message, the method comprising:
   inserting the formed reception-time information into or appended to the received message; and
   forwarding the received message with the inserted reception-time information such that the reception-time information is received by at least one synchronization application of the device;
   deleting a piece of check information transmitted in the received message or formed from a part of the received message after an integrity check is performed during the inserting of the reception-time information; and
   wherein the physical layer of the device comprises a time stamp unit and the formed reception-time information is formed by the time stamp unit of the physical layer.

2. A method for transmitting a piece of reception-time information formed in or at a physical layer of a device on reception of a synchronization-relevant message, the method comprising:
   inserting the formed reception-time information into or appended to the received message;
   updating the received message after insertion of the reception-time information, wherein a piece of check information transmitted in the received message or formed from a part of the received message containing the reception-time information or formed from an entirety of the received message is updated during the updating of the received message after insertion of the reception-time information; and
   forwarding the received message with the inserted reception-time information such that the reception-time information is received by at least one synchronization application of the device; and
   wherein the physical layer of the device comprises a time stamp unit and the formed reception-time information is formed by the time stamp unit of the physical layer.

3. A device for transmitting a piece of reception-time information, comprising:
   an information forming device that forms a piece of reception-time information in or at a physical layer of the device for transmitting a piece of reception-time information for a message received by the device for transmitting a piece of reception-time information, wherein the information forming device is comprised of a time stamp unit in or at the physical layer of the device for transmitting a piece of reception-time information and wherein at least one synchronization application is comprised of at least one application of an application layer of the device for transmitting a piece of reception-time information; and
   an insertion device that inserts or appends the formed reception-time information into or onto the received message for forwarding the received message with the formed reception-time information to the at least one synchronization application of the device for transmitting a piece of reception-time information; and wherein the time stamp unit updates at least one piece of check information transmitted in the received message after insertion of the reception-time information.

4. A device for transmitting a piece of reception-time information, comprising:
- an information forming device that forms a piece of reception-time information in or at a physical layer of the device for transmitting a piece of reception-time information for a message received by the device; and
- an insertion device that inserts or appends the formed reception-time information into or onto the received message for forwarding the received message with the formed reception-time information to at least one synchronization application of the device for transmitting a piece of reception-time information; and
- wherein the insertion device utilizes a time stamp unit to insert the reception-time information;
- wherein the information forming device utilizes the time stamp unit to form the reception-time information and wherein the time stamp unit operates in accordance with a precision time protocol;
- wherein the reception-time information is inserted or appended into a header of the received message; and
- wherein the device for transmitting a piece of reception-time information checks the integrity of at least one piece of check information transmitted in the received message and then deletes the check information from the received message so that the forwarded received message does not contain the check information.

* * * * *